United States Patent Office 2,788,617
Patented Apr. 16, 1957

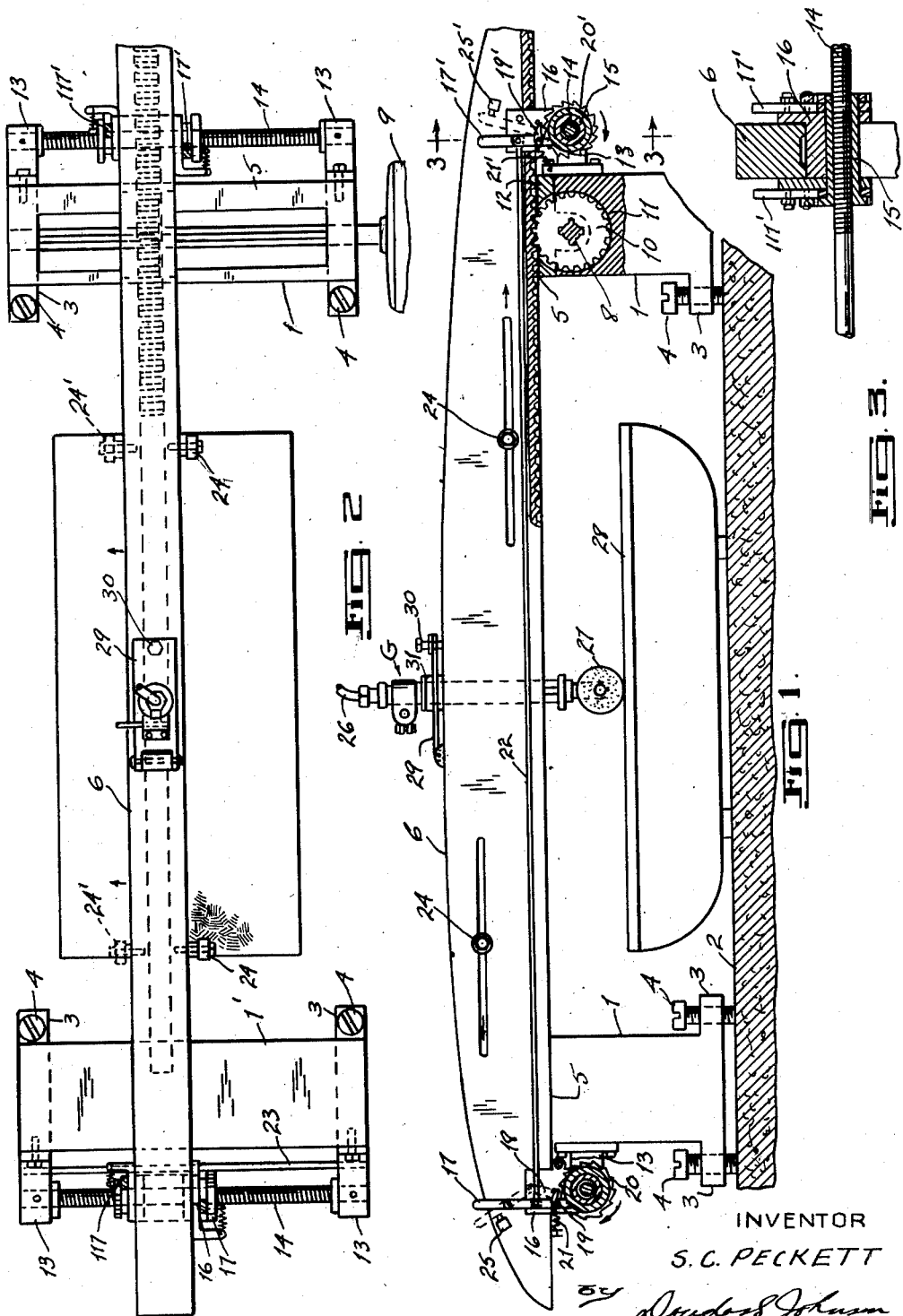

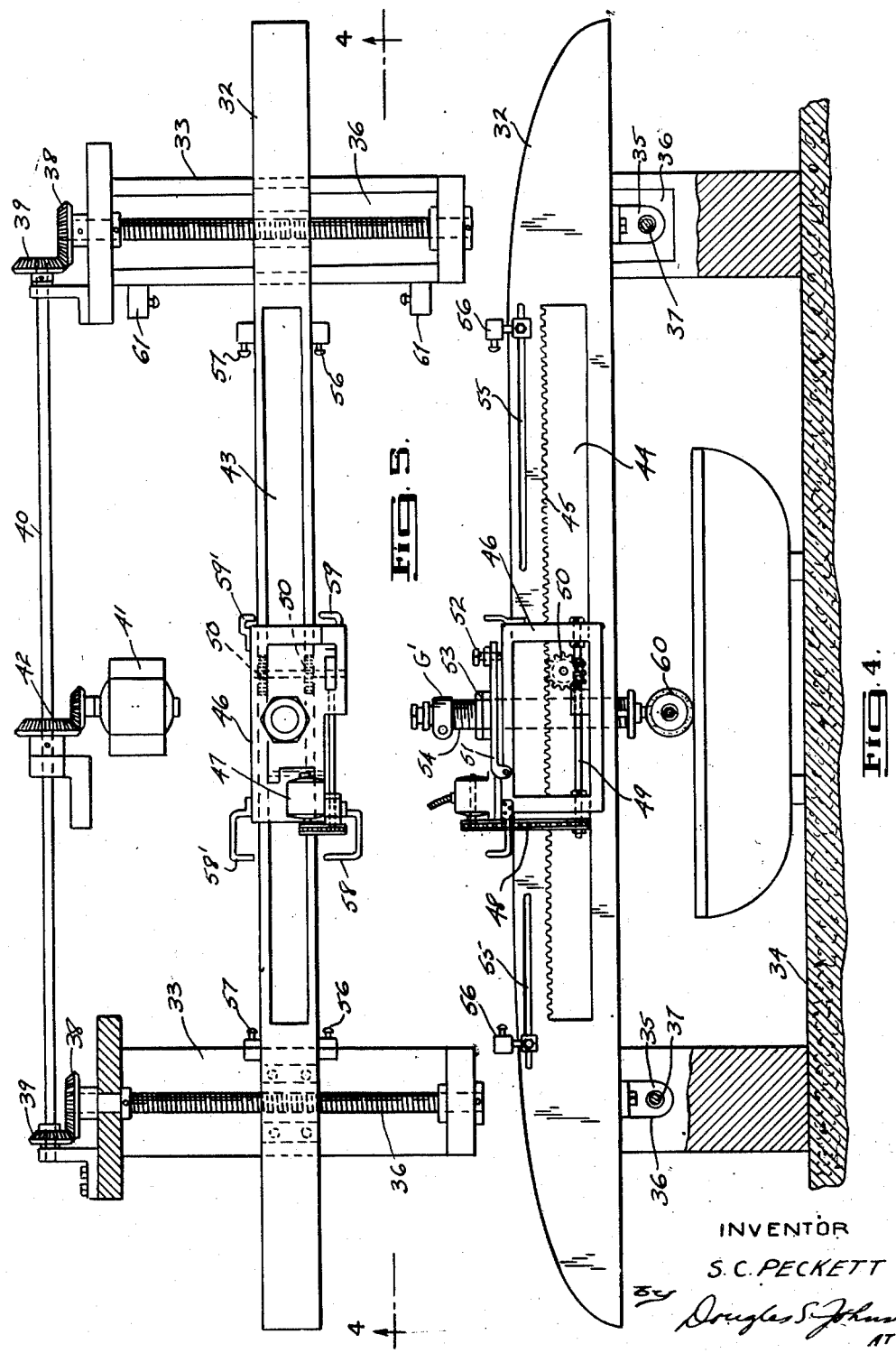

2,788,617

MEANS FOR SURFACING TRUE SURFACE ARTICLES

Samuel Charles Peckett, Toronto, Ontario, Canada

Application September 13, 1954, Serial No. 455,669

11 Claims. (Cl. 51—34)

This invention relates to improvements in the preparation of true surfaces, and more particularly to the preparing of true surfaces on large objects such as large surface plates, parallels, straight edges and the like.

In the preparation of true surfaces the surface must be perfectly accurate but must not be dead smooth otherwise suction will prevent other surfaces from moving easily over the true surface. In consequence it is known in the art to be highly desirable to finely scrape or score the surface while leaving the accuracy unimpaired.

While different scraping apparatus have been evolved industry has not found these completely satisfactory and where optimum results are required almost invariably resort is made to the old laborious time-consuming hand scraping.

There are many problems in the surfacing with mechanical apparatus; the accuracy of the surface is usually spoilt by deformation under the heat and/or pressure of the grinding surface; the surface is liable to be damaged by cutting too deeply with a positively driven grinder and the surfaces of angled members and small area surfaces are almost inaccessible to the grinding elements.

Further, in addition to a lack of complete accuracy, the desirability and uniformity of appearance of the finished surfaces ground with mechanical apparatus has heretofore fallen short of the old hand scraped surface. The problem of providing accurate surfaces with grinding apparatus is steadily becoming more acute as relatively few skilled and experienced men capable of fine work are available and their number is steadily decreasing.

In my United States Patent No. 2,688,826, I have disclosed a method and apparatus which will render machine-ground true surfaces superior to the finest hand scraped surfaces for accuracy, uniformity and appearance providing a particularly desirable surface pattern which can be produced by relatively inexperienced workmen at a great saving in costs.

In copending application, Ser. No. 455,453, now United States Patent No. 2,771,713, I have disclosed a method and apparatus especially adapted to the preparation of multi-surfaced true surfaced articles or objects such as angle plates, cubes, V blocks and the like and also for the preparation of true surfaces on large objects.

As pointed out above it is extremely difficult to produce hand scraped true surfaced articles and previous machine grinding has had serious disadvantage and has always relied at least in part on manual controls and has been subject to human error particularly in the hands of careless or not fully skilled workmen.

In hand scraping the tediousness and difficulty of the scraping is multiplied many times as the area of the surface increases.

This fact will be apparent when it is considered that if in error any point or small area of this surface is scraped too deeply to a point below the general level of the remainder of the surface then the entire remaining surface must again be re-scraped.

It is the object of the present invention to provide an apparatus particularly adapted to produce precisely accurate true surfaces on large objects such as large surface plates and the like.

It is another important object to provide apparatus as aforesaid which will not only itself be economical but which will carry out the surfacing operation completely automatically to provide an enormous reduction in the time required for and the cost involved in the preparation of true surfaces.

Again it is an object to provide apparatus as aforesaid which will produce a highly desirable surface more accurate and uniform in appearance than possible with hand scraping. The principal feature of the invention resides in mounting a master straight edge or beam on a pair of spaced parallel ways to move longitudinally thereof, mounting a grinding device on the beam structure to move transversely between the ways providing means for actuating the beam longitudinally of the ways and means for actuating the grinding device transversely of the ways. In accordance with the invention the grinding device employed is of the type disclosed in said United States Patent 2,688,826 which is adapted to cut or grind the surface to be trued with an interrupted cutting or grinding action while continuously changing the direction of the cut to reduce the surface to an accurate level while presenting a distinctive and uniform surface pattern of criss-crossing overlapping surface cuts defining a multiple of high spots constituting the true surface separated by valleys between said spots.

With the apparatus disclosed in the said Patent No. 2,688,826 the surface is maintained free from significant heat distortion and further it has been found that with such a cutting action it is not necessary during grinding to clamp or secure the surface in any manner which would set up stress or cause deflections.

Another feature of the invention resides in providing simple mechanisms for actuating the straight edge or beam in its movement longitudinally of the ways and the grinding device transversely of the ways.

These and other objects and features will become apparent from the following description taken in conjunction with the accompanying drawings in which:

Figure 1 is a part end elevational part vertical sectional view of a surfacing apparatus embodying the invention.

Figure 2 is a plan view of the apparatus of Figure 1.

Figure 3 is a vertical sectional detail on an enlarged scale taken on the line 3, 3 of Figure 1.

Figure 4 is a part end elevational part vertical sectional view of an alternative form of apparatus embodying the invention the section being taken on the line 4, 4 of Figure 5.

Figure 5 is a plan view partly broken away of the apparatus of Figure 4.

Referring first to Figures 1–3 the apparatus illustrated comprises a pair of parallel longitudinal rails 1, 1' arranged in spaced relation preferably on a large master surface 2 such as a large surface plate but which may in certain instances be a support surface in the form of concrete flooring. The bases of the rails 1 at the ends thereof are extended laterally as at 3 and carry adjusting screws 4 so that the rails may be adjusted to bring their upper surfaces 5 into accurately level coplanar relation, these surfaces being formed precisely flat true surfaces.

Bridging the rails 1 is a master straight edge or beam 6 which is adapted to slide longitudinally in a direction transversely of the rails 1 on the surfaces 5 and also to move longitudinally of the rails.

To provide this movement the central portion of one end of the straight edge is formed with a toothed rack formation 7 and journalled in the right hand rail 1' to extend longitudinally thereof is a shaft 8 driven by a reversible motor 9. Splined on the shaft 8 is a gear 10 operating longitudinally of the rail 1 in a recess 11 and the gear 10 is arranged to mesh with the toothed formation 7 of the straight edge or beam 6. A longitudinal slotted plate 12 closes the recess 11 in the rail 1 and the gear 10 is adapted to operate up through the slot of the cover plate as the straight edge moves longitudinally of the rail, the plate 12 forming the upper surface 5 of the rail 1.

Each of the rails 1 and 1' are provided with outwardly extending brackets 13 between which extend threaded shafts 14. Each of these shafts has threaded thereon a sleeve 15 journalled in a U-shaped frame or bracket 16. The left hand frame 16 carries a lever 17 connected through a link 18 with a pawl 19 adapted to engage a ratchet member 20 carried by the sleeve 15 as illustrated in Figure 1.

As seen from Figure 1 the mechanism 17, 18, 19 and 20 is shown in front of the beam 6 so that anti-clockwise movement of the lever 17 effects through the ratchet and pawl a clockwise rotation of the respected sleeve 15 threaded longitudinally of its respective threaded shaft 14. Again as viewed in Figure 1 looking at the right hand sleeve 15 a lever 17' carries a pawl 19' to engage a ratchet member 20' to effect clockwise movement of the right hand sleeve 15 upon clockwise movement of the lever 17'. Springs 21 and 21' maintain the pawls 19 and 19' normally in engagement with the respective ratchet members 20 and 20'.

A connecting rod 22 is connected between the levers 17 and 17' so that operation of either lever from the solid line to the dotted line position effects the operation of the opposite lever to the corresponding position.

As seen from Figure 1 and also Figure 2 a guide rod 23 extends longitudinally of the left hand rail 1 between the brackets 13 and extends through the left hand U-frame 16 to maintain it in an upright position. The master straight edge or beam 6 as illustrated in Figure 3 is received between the walls of the U-frames 16 and as the sleeves 15 journalled in these frames are threaded longitudinally of the threaded shafts 14 the beam 6 is carried therewith along with the splined gear 10 engaging with the toothed formation 7. Mounted on slots on the beam 6 are adjustable stops 24 which, as the beam is reciprocated longitudinally, engage the respective levers 17 and 17' to effect at each end of the stroke of the beam a movement longitudinally of the threaded shafts 14. Also, at the end of each stroke of the beam the levers 17 or 17', as the case may be, strike and actuates switch mechanisms 25 and 25' controlling the reversible motor 9 to reverse the drive and hence beam movement.

The beam 6 has mounted thereon a grinding unit indicated at G preferably of the type disclosed in Patent No. 2,688,826 which is driven through an air hose 26 to operate a grinding wheel 27 over a surface to be trued such as the surface of a surface plate 28. A pivotal plate 29 provided with a levelling screw 30 enables the grinding device G to be located in an exact vertical plane and locknuts 31 carried by the grinding device G permit vertical adjustment of position of the grinding wheel 27. While the levers 17 and 17' and the pawl and ratchet members actuated thereby shown in Figure 1 in front of the beam 6 produce clockwise rotation of the sleeves 15 on the shafts 14 corresponding levers 117 and 117' having reverse relationship slocated on the opposite face of the beam 6 are adapted to actuate the sleeves 15 in a reverse direction to reverse feed of the beam longitudinally of the rails 1 and 1', when the stops 24' shown in dotted line in Figure 2 are secured to the beam.

In operation the beam 6 is reciprocated transversely of the rails 1 and 1' by the reversible drive 9 which is reversed at each end of the stroke of the beam by the levers 17 and 17' striking the switches 25 and 25' respectively. At the same time upon the stops 24 or 24' striking their respective levers 17, 17', 117 or 117', the feed of the beam longitudinally of the rails 1 and 1' is effected. Thus, the grinding wheel 29 is caused to move back and forth across the surface of the surface plate 28 with a stepped feed longitudinally of the rails 1 and 1' so that complete coverage of the surface plate is achieved. With the grinding device G as disclosed in the said Patent No. 2,688,826 an interrupted cutting action is achieved in which the direction of cut is continually changing as taught in the said copending application to reduce the surface being ground to an accurately level surface having a highly desirable surface pattern, the surface being maintained free of significant heat distortion and the surfacing being carried out without the necessity of clamping the surface plate or other object being surfaced.

In the modification of the invention shown in Figures 3 and 4 the master straight edge or beam 32 is mounted to move longitudinally of a pair of parallels 33 disclosed on a true surface preferably a very large surface plate 34. The straight edge 32 carries depending sleeves 35 operating in longitudinal slots 36 in the upper surface of the parallels and these sleeves 35 are threaded to form nut members engaging longitudinal threaded shafts 37 extending longitudinally of the parallels in slots 36. The shafts 37 carry bevel gears 38 with which mesh pinions 39 carried by a transverse shaft 40 extending between the parallels and driven from a reversible motor 41 through a gear drive 42. The driving motor 41 on operation thus rotates shafts 37 to feed the sleeves 35 then hence the master straight edge longitudinally of the parallels 33. The straight edge 32 has a vertical slot therethrough indicated at 43 and side slots 44 the upper edges of which are formed to provide a toothed rack formation 45. A carriage 46 fits down over the master straight edge 32 and carries a reversible motor 47 which drives through a chain 48, worm shaft 49, a pair of pinion wheels 50, meshing with the racks 45. Also carried by the carriage and operating through the slot 43 is a grinding device G' of the type disclosed in the said copending application Serial No. 276,972, now Patent No. 2,688,826, and this grinding device is mounted for vertical adjustment on a hinge plate 51 which can be raised and lowered for micrometer variations by means of a thumb screw 52. Major or larger adjustments are achieved by threading the nuts 53 up or down on the threaded casing 54 of the grinding device. Mounted on the sides of the beam 32 in slots 55 are two sets of micro-switches 56 and 57 which control the reversing motor 47 mounted on the carriage and the drive motor 41 respectively. In operation with the carriage motor 47 energized the carriage is actuated longitudinally of the beam 32 until one of the arms 58 or 59 carried by the carriage strikes one of the micro-switches 56 which switch is connected to reverse the motor 41 to return the carriage in the opposite direction with suitable wiring (not shown) being provided to allow this carriage movement. At the same time the corresponding arms 58' and 59' actuate the micro-switches 57 to energize the drive motor 41 to effect feed of the beam longitudinally of the parallels 33 during the short interval that the carriage is at the end of its stroke and the switches 56 are operated. In this way the grinding wheel 60 with its peculiar composite motion above described is traversed back and forth across the surface plate 34 and at the same time fed with a stepped motion longitudinally of the parallels 33 so that it automatically sweeps out a path covering the entire surface area of the surface plate. When the master straight edge 32 reaches the end of its stroke longitudinally of the parallels 33 it actuates suitable micro-switches 61 which affect reversal of the rotation of the feed motor 41 to return the beam longitudinally of the rails. Thus with apparatus as described the surfacing of the surface plate or other article to be trued is carried out completely automatically in a rapid and easy manner. It will be understood that variations in detail of construction of the ap-

What I claim as my invention is:

1. A surfacing apparatus comprising a pair of spaced, elongated rails presenting spaced coplanar bearing surfaces of precise flatness, a beam having an accurate under bearing surface bridging said rails and mounted to move longitudinally thereof with said accurate beam under surface sliding directly on said rail bearing surfaces, screw feed means for operating said beam longitudinally of said rails, a grinding device carried by said beam and movable transversely of said rails between predetermined limit positions, automatic reversible drive means to operate said grinding device between said limit positions, and automatic means operable upon said grinding device reaching said limit positions to actuate said feed means to move said beam along said rails in a series of steps, said grinding device is mounted in a carriage slidable longitudinally of said beam and said reversible drive means is carried by said carriage.

2. A device as claimed in claim 1 in which said reversible drive comprises a gear member mounted on said carriage and engaging a rack formation carried by said beam, and a reversing motor for actuating said gear member carried by said carriage.

3. A device as claimed in claim 2 in which said feed means for feeding said beam longitudinally of said rails comprises a reversible motor, switch mechanisms controlling both of said reversible motors mounted on said beam adjacent the limits of carriage travel, and means carried by said carriage to actuate said switch mechanisms as said carriage reaches the limits of its travel.

4. A surfacing apparatus comprising a pair of spaced elongated rails presenting spaced coplanar bearing surfaces of precise flatness, a beam having an accurate underbearing surface bridging said rails and mounted to move longitudinally thereof with said accurate bearing undersurface sliding directly on said rail bearing surfaces, screw feed means for operating said beam longitudinally of said rails, a grinding device secured to said beam against movement relative thereto, said beam being movable transversely of said rails between predetermined limit positions, automatic reversible drive means to operate said beam transversely of said rails between said limit positions, and automatic means operable upon said beam reaching said limit positions to actuate said feed means to move said beam along said rails in a series of steps.

5. A device as claimed in claim 4 in which said reversible drive means comprises a toothed formation formed on the underside of said beam, a drive gear for coacting with said formation splined on a shaft extending parallel to said rails and movable longitudinally of said shaft, means maintaining said toothed formation and gear in engagement during movement of said beam longitudinally of said rails, and a reversible motor drive for driving said shaft.

6. A device as claimed in claim 4 in which said screw feed means comprises a pair of longitudinal screw threaded shafts extending parallel to said rails, brackets on which said beam slides transversely of said rails having journalled therein below said beam internally threaded sleeves threaded on said threaded shafts, ratchet means for rotating said sleeves and means carried by said beam for actuating said ratchet means upon said beam reaching said predetermined limit positions.

7. Means for surfacing true surface articles comprising a precisely accurate horizontal planar work support surface, a pair of spaced parallel elongated rails supported freely from said planar work support surface for movement thereon in any horizontal direction, said rails having precisely accurate upper surfaces, a beam structure supported by and bridging said rails and movable longitudinally thereof, said beam having a precisely accurate under surface sliding directly on said upper rail surfaces, a grinding device carried by said beam structure to move transversely between said rails, means for actuating said beam longitudinally of said rails, and means for actuating said grinding device transversely of said rails.

8. Means for surfacing true surface articles comprising a precisely accurate horizontal planar work support surface, a pair of spaced parallel elongated rails supported freely from said planar work support surface for movement thereon in any horizontal direction, said support rails presenting precisely level and coplanar longitudinal true surfaces, a straight edge having a precisely accurate under true surface bridging said rails and moving longitudinally thereof with said under true surface sliding directly on said longitudinal true surfaces, a grinding device carried by said straight edge and movable transversely of said rails between predetermined limit positions, means automatically operable upon said grinding device reaching a limit position to feed said straight edge along said rails, and automatic means to actuate said grinding device between said limit positions.

9. Means for surfacing true surface articles comprising a precisely accurate horizontal planar work support surface, a pair of spaced parallel elongated rails supported freely from said planar work support surface for movement thereon in any horizontal direction, said rails presenting precisely level spaced planar true surfaces forming bearing surfaces, a master straight edge having a precisely accurate under true surface bridging said rails, feed means for operating said straight edge longitudinally of said rails with said under true surface sliding directly on said rail true surfaces, a grinding device carried by said straight edge and movable transversely of said rails between predetermined limit positions, means automatically operable upon said grinding device reaching said limit positions to actuate said feed means to feed said straight edge with a stepped movement, and automatic means to actuate said grinding device betwen said limit positions.

10. A surfacing apparatus comprising a pair of spaced elongated rails presenting spaced coplanar bearing surfaces of precise flatness, a beam having an accurate under bearing surface bridging said rails and mounted to move both transversely and longitudinally thereof with said accurate beam under surface sliding directly on said rail bearing surfaces, a grinding device carried by said beam, means for operating said beam longitudinally of said rails, and means for operating said beam transversely of said rails.

11. A device as claimed in claim 10 in which said beam is formed with an intaglio toothed formation on its underside, and the means for operating said beam transversely of said rails comprises a drive gear for coacting with said toothed beam formation mounted on and movable longitudinally of a longitudinal shaft extending longitudinally of said rails and means for driving said gear.

References Cited in the file of this patent

UNITED STATES PATENTS

| | | |
|---|---|---|
| 741,335 | Hibbard | Oct. 13, 1903 |
| 1,027,558 | Meyers | May 28, 1912 |
| 1,423,266 | Sears | July 18, 1922 |
| 1,751,931 | Legge | Mar. 25, 1930 |
| 1,958,203 | Pfau | May 8, 1934 |
| 2,202,767 | Trosch | May 28, 1940 |
| 2,321,441 | Webber | June 8, 1943 |
| 2,660,096 | Morton | Nov. 24, 1953 |

FOREIGN PATENTS

| | | |
|---|---|---|
| 11,497 | Great Britain | July 18, 1889 |